US006358173B1

(12) United States Patent
Klemen et al.

(10) Patent No.: US 6,358,173 B1
(45) Date of Patent: Mar. 19, 2002

(54) TWO-MODE, COMPOUND-SPLIT, ELECTRO-MECHANICAL VEHICULAR TRANSMISSION HAVING SIGNIFICANTLY REDUCED VIBRATIONS

(75) Inventors: Donald Klemen; Michael Roland Schmidt, both of Carmel, IN (US)

(73) Assignee: General Motors Corporation, Detroit, MI (US)

( * ) Notice: Subject to any disclaimer, the term of this patent is extended or adjusted under 35 U.S.C. 154(b) by 17 days.

(21) Appl. No.: 09/591,794

(22) Filed: Jun. 12, 2000

(51) Int. Cl.[7] .............................................. F16H 3/72
(52) U.S. Cl. ........................................ 475/5; 74/606 R
(58) Field of Search ............................. 475/5; 74/606 R

(56) References Cited

U.S. PATENT DOCUMENTS

| | | | | |
|---|---|---|---|---|
| 1,307,230 A | * | 6/1919 | Zweigbergk | 475/5 |
| 2,050,185 A | * | 8/1936 | Kibler | 475/5 |
| 2,578,837 A | * | 12/1951 | Raney | 475/5 |
| 4,779,486 A | * | 10/1988 | Schumacher | 475/5 |
| 5,558,588 A | * | 9/1996 | Schmidt | 475/5 |
| 5,931,757 A | | 8/1999 | Schmidt | 475/2 |
| 5,935,035 A | * | 8/1999 | Schmidt | 475/5 |
| 6,022,287 A | | 2/2000 | Klemen et al. | 475/5 |

FOREIGN PATENT DOCUMENTS

GB              399223        * 11/1933  ................... 475/5

* cited by examiner

*Primary Examiner*—Sherry Estremsky
(74) *Attorney, Agent, or Firm*—Leslie C. Hodges

(57) ABSTRACT

A two-mode, compound-split, electro-mechanical transmission utilizing an input member and an output member for delivering power to and from the transmission as well as a plurality of planetary gear subsets that circumscribe an axially-extending transmission main shaft. Selective of the aforesaid planetary gear subsets are, in turn, circumscribed by first and second motor/generators. Structural means are employed to ground the various rotating members against movement in other than their desired rotation. Selected planetary gear subsets may also employ uniquely configured carrier cage assemblies that assure the necessary meshing engagement of the planet gears supported therein with the outer ring gear and the inner sun gear of the planetary gear subsets within which the unique carrier cage assemblies are associated while precluding lateral movement of the planet gears as well as movement thereof in directions other than that of their respectively desired rotation.

14 Claims, 10 Drawing Sheets

TWO-MODE, COMPOUND-SPLIT, ELECTRO-MECHANICAL VEHICULAR TRANSMISSION HAVING SIGNIFICANTLY REDUCED VIBRATIONS

TECHNICAL FIELD

The present invention relates broadly to vehicular transmissions. In general, the present invention relates to two-mode, compound-split, vehicular transmissions. More particularly, the present invention relates to two-mode, compound-split, vehicular transmissions that utilize supplemental power receiving/delivery units that may derive their power either directly or indirectly from the vehicle engine and selectively impart it to compounded planetary gear subsets in the transmission. Specifically, the present invention relates to a two-mode, compound-split, electromechanical, vehicular transmission wherein the interactive planetary gear arrangements that are operatively connected to an engine and two power receiving/delivery units—motor/generators, as shown—that may be annularly configured. The planetary gear arrangements as well as the two motor/generators are disposed coaxially with the planetary gear arrangements located radially inwardly of the motor/generators. The rotatable members in the planetary gear subsets and the motor/generators are supported either directly by the transmission housing or indirectly by the transmission housing through a transmission main shaft that is also coaxially disposed relative to the aforesaid transmission components such that the rotating components which might otherwise induce undesirable vibrations are laterally grounded to minimize such vibrations.

BACKGROUND OF THE INVENTION

The purpose of a vehicular transmission is to provide a neutral, at least one reverse and one or more forward driving ranges that impart power from an engine, and/or other power sources, to the drive members which deliver the tractive effort from the vehicle to the terrain over which the vehicle is being driven.

As explained in detail in U.S. Pat. No. 5,931,757, the challenge is to provide a power system that will operate at high efficiencies over a wide variety of operating conditions. Desirable electric variable transmissions should leverage not only the benefits of a series, hybrid transmission for desirable low-average power duty cycles—i.e.: low speed start/stop duty cycles—but also the benefits of a parallel hybrid transmission for high-average output power, high speed duty cycles.

In a parallel arrangement the power supplied by the engine and the power supplied by the source of electrical energy are independently connected to the drive members. Perfecting a concept wherein two modes, or gear trains, are available for synchronous selection by the on-board computer to transmit power from the engine and/or selected motor/generators to the output shaft results in a hybrid transmission having an extremely wide range of applications, and the most desirable of the beneficial results may be achieved by the use of a variable, two-mode, input-split, parallel, hybrid electro-mechanical transmission.

With reference, again, to a simple planetary gear set, the planet gear members are normally supported for rotation on a carrier that is itself rotatable. When the sun gear is held stationary and power is applied to the ring gear, the planet gear members rotate in response to the power applied to the ring gear and thus "walk" circumferentially about the fixed sun gear to effect rotation of the carrier in the same direction as the direction in which the ring gear is being rotated.

However, when any two members of a simple planetary gear set rotate in the same direction and at the same speed, the third member is forced to turn at the same speed, and in the same direction. For example, when the sun gear and the ring gear rotate in the same direction, and at the same speed, the planet gears do not rotate about their own axes but rather act as wedges to effect rotation of the carrier with the sun and ring gears.

When the two gear members rotate in the same direction, but at different speeds, the direction in which the third gear member rotates may often be determined simply by visual analysis, but in many situations the direction will not be obvious and can only be determined by knowing the number of teeth present in the gear members of the planetary gear set.

Whenever the carrier is restrained from spinning freely, and power is applied to either the sun gear or the ring gear, the planet gear members act as idlers. In that way the driven member is rotated in the opposite direction as the drive member. Thus, in many transmission arrangements when the reverse drive range is selected, a torque transfer device serving as a brake is actuated frictionally to engage the carrier and thereby restrain it against rotation so that power applied to the sun gear will turn the ring gear in the opposite direction. Thus, if the ring gear is operatively connected to the drive wheels of a vehicle, such an arrangement is capable of reversing the rotational direction of the drive wheels, and thereby reversing the direction of the vehicle itself.

The aforesaid U.S. Pat. No. 5,931,757 teaches those skilled in the art that when the variable, two mode, input-split, parallel, hybrid electro-mechanical transmission as well as the two motor/generators are coaxially disposed and the motor/generators are each configured as an annulus, the motor/generators may circumscribe one or more of the planetary gear arrangements such that the planetary gear arrangements are disposed radially inwardly of the motor/generators.

However, if careful attention is not given to the configuration and placement of the supports for at least the more massive of the various rotating members—i.e.: the sun gear, the ring gear, the carrier and/or the rotors of the motor/generators—undesirable vibrations may be induced. Historically, for example, the mass of the planetary gear subsets and the mass of the circumscribing rotors in the motor/generators were supported solely the rotor bearings. While efficient, this arrangement does not necessarily preclude the vibrations induced by rotation of the aforesaid masses.

SUMMARY OF THE INVENTION

It is, therefore, one primary aspect of the present invention to provide an improved and novel, two-mode, compound-split, transmission incorporating supplemental power receiving/delivery units in such a way that the transmission is enhanced by reduced vibrations.

It is another aspect of the present invention to provide a novel, two-mode, compound-split, electro-mechanical transmission, as above, wherein the transmission employs a main shaft that is rotatably supported from the rigid transmission housing so as to reduce vibrations.

It is a further aspect of the present invention to provide a novel, two-mode, compound-split, electro-mechanical transmission, as above, wherein the rotors of the motor/generators utilized to provide the supplemental power receiving/delivery units are supported from the transmission housing in such a manner as to minimize vibrations.

It is still another aspect of the present invention to provide a novel, two-mode, compound-split, electro-mechanical transmission, as above, wherein the planet gears of at least selected planetary gear subsets are incased in a uniquely configured cage-like carrier that is rotatably supported from the rigid, transmission housing through the transmission main shaft so as to minimize vibrations.

These and other aspects of the invention, as well as the advantages thereof over existing and prior art forms, which will be apparent in view of the following detailed specification, are accomplished by means hereinafter described and claimed.

By way of a general introductory description, a two-mode, compound-split, electro-mechanical transmission embodying the concepts of the present invention utilizes an input member for receiving power from a prime mover power source and an output member for delivering power from the transmission. The transmission utilizes a plurality of planetary gear subsets that circumscribe a transmission main shaft which extends axially within the transmission and at least selective of the aforesaid planetary gear subsets are, in turn, circumscribed by first and second motor/generators.

Unique structural means are employed to ground the various rotating members in order to preclude them from lateral movement while not interfering with their desired rotation.

Selected planetary gear subsets may also employ uniquely configured carrier cage assemblies that assure the necessary meshing engagement of the planet gears supported therein with the outer ring gear and the inner sun gear of the planetary gear subsets within which the unique carrier cage assemblies are associated. The unique configurations of the carrier cage assemblies not only preclude lateral movement thereof, but also movement of the planet gears supported therein in directions other than that of their respectively desired rotation.

To acquaint persons skilled in the arts most closely related to the present invention, one representative preferred embodiment of a two-mode, compound-split, electro-mechanical transmission now contemplated for putting the invention into practice is described herein by, and with reference to, the annexed drawings that form a part of the specification.

It must be understood that the aforesaid exemplary form of a preferred two-mode, compound-split, electro-mechanical transmission is described in detail without attempting to show all of the various forms and modifications of the essential elements in which the invention might be embodied.

As such, the embodiment shown and described herein is only illustrative, and as will become apparent to those skilled in these arts can be modified in numerous ways within the spirit and scope of the invention; the invention being measured by the appended claims and not by the details of the specification.

DESCRIPTION OF THE PREFERRED EMBODIMENT

The present invention is readily incorporated in a two-mode, compound-split, electro-mechanical transmission such as that to which U.S. Pat. No. 6,022,287, is directed. Accordingly, that unique transmission, but adapted to incorporate the concepts of the present invention, is designated generally by the numeral 10 on the accompanying drawings.

Figure 1:
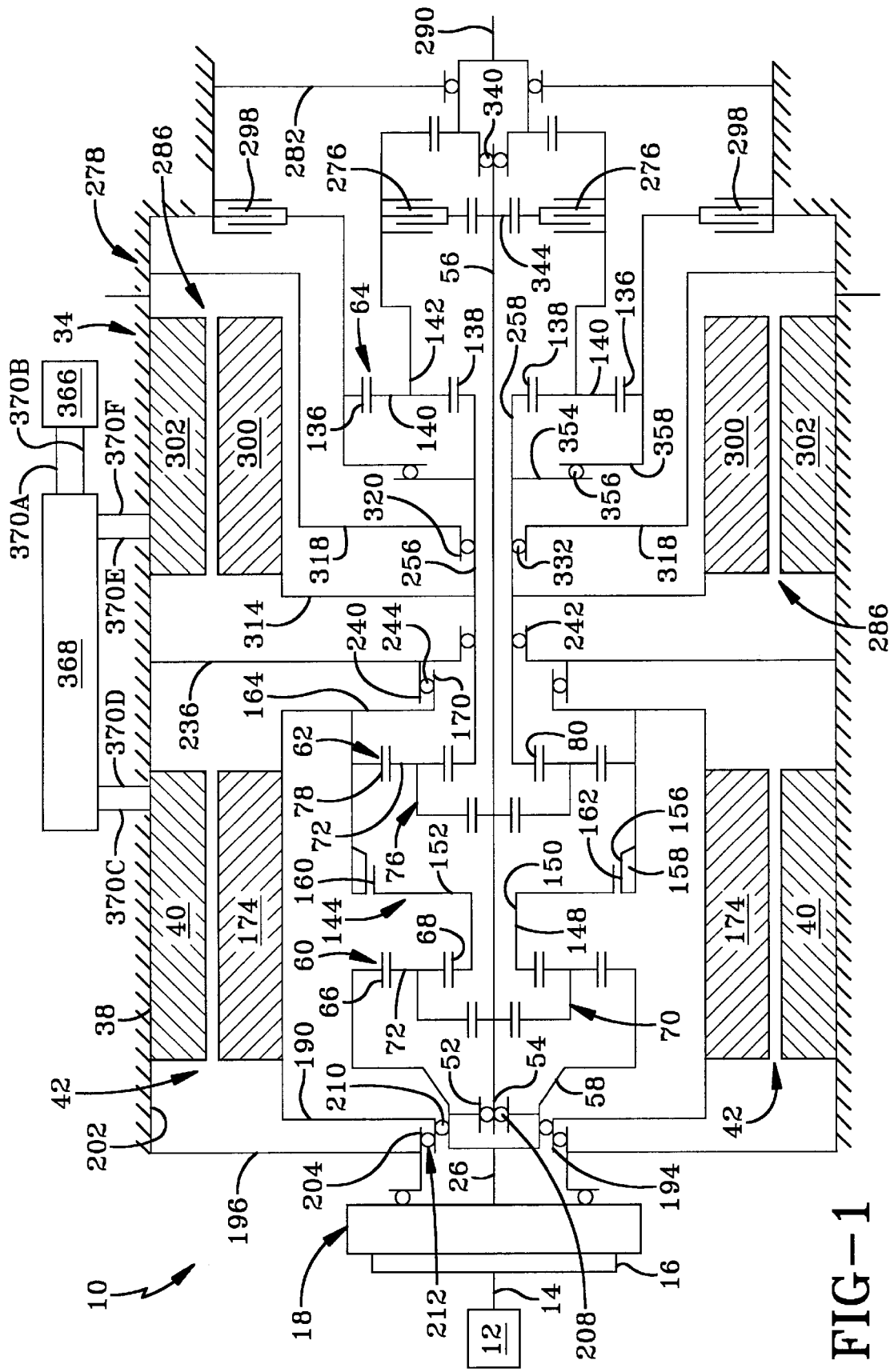
FIG. 1 is a schematic representation of one preferred form of a two-mode, compound-split, electro-mechanical transmission embodying the concepts of the present invention.
Figure 2:
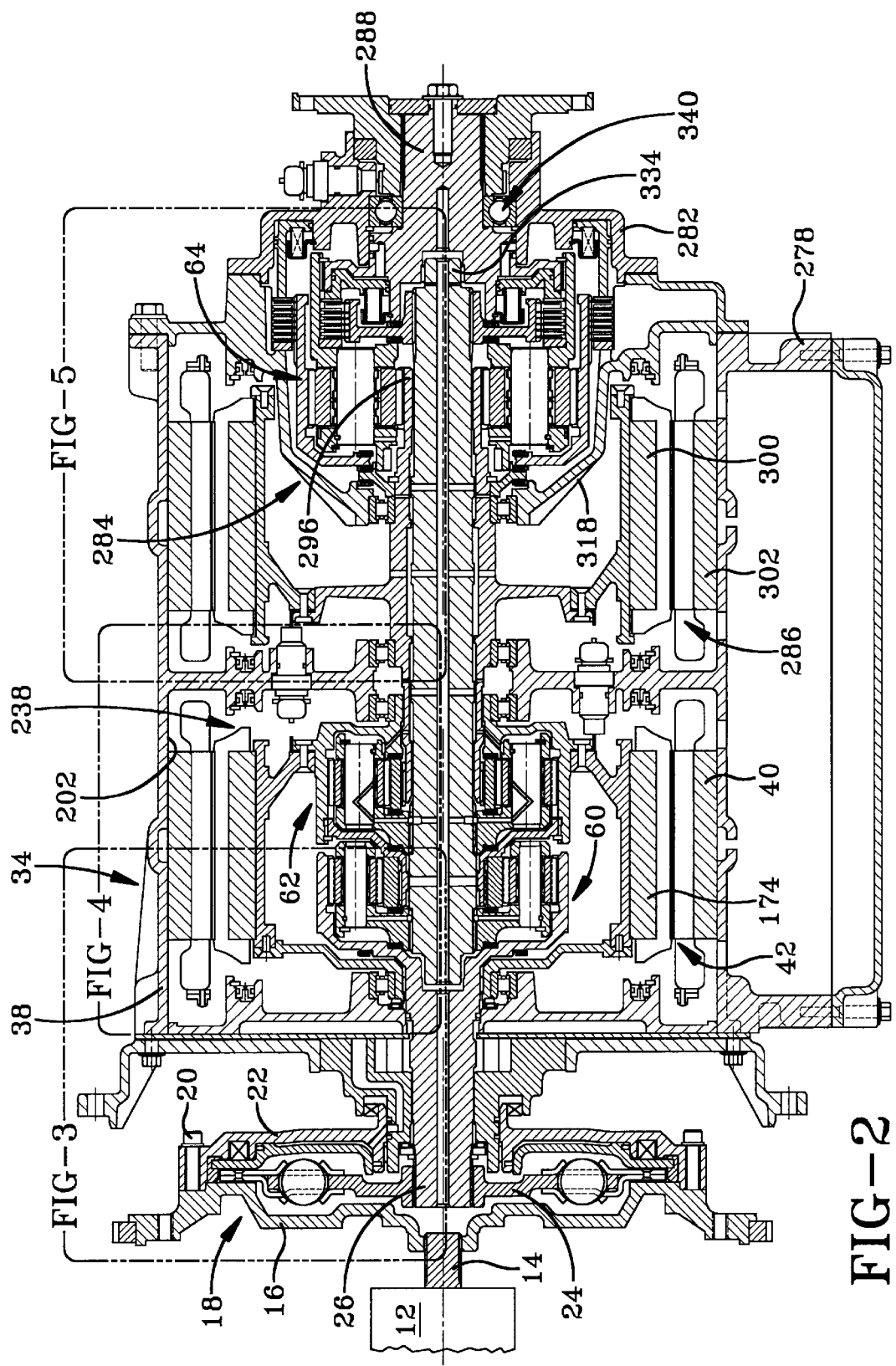
FIG. 2 is a diagrammatic representation presented as a generally longitudinal section of the preferred embodiment of the transmission schematically depicted in FIG. 1.
Figure 3:
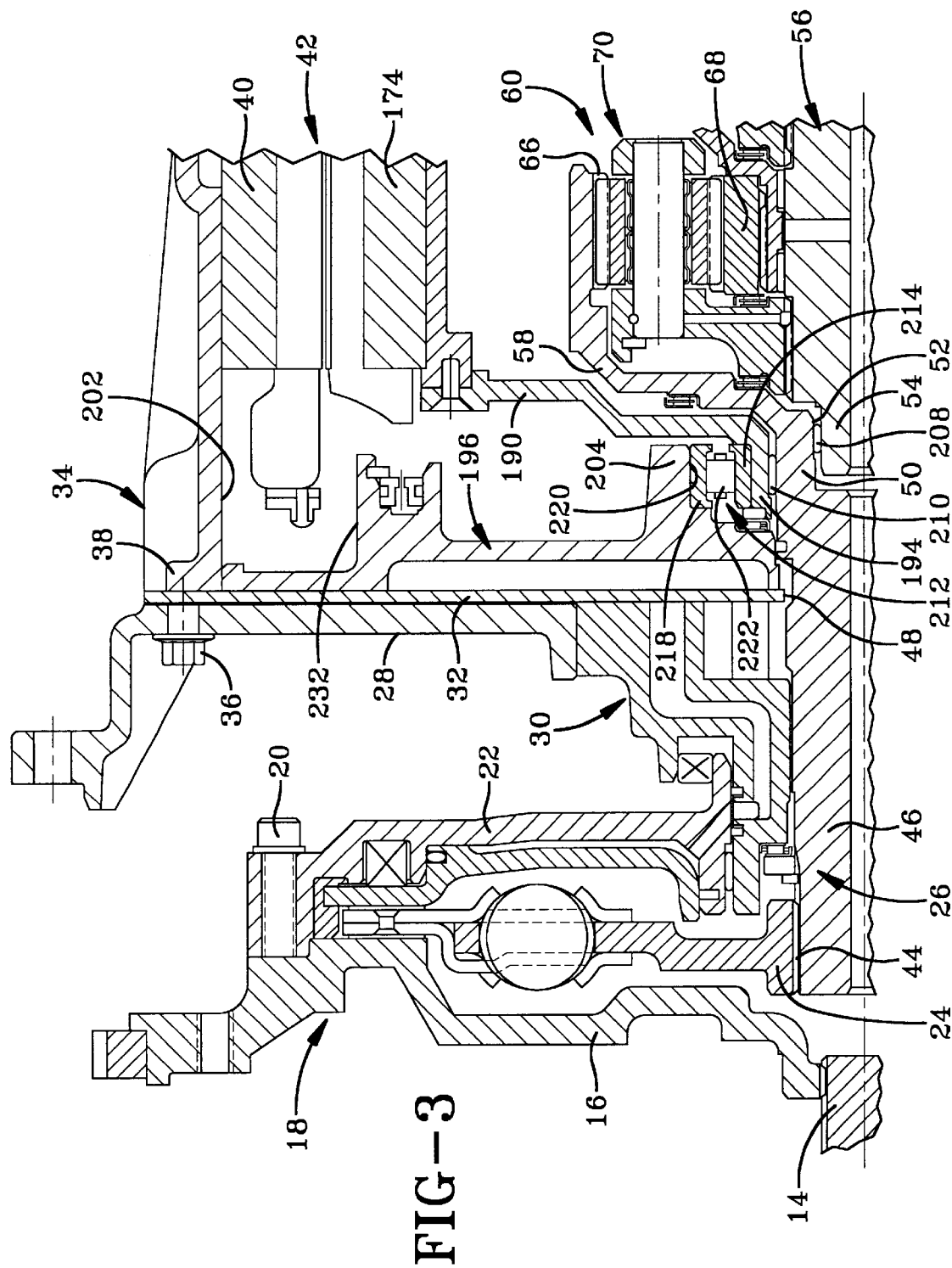
FIG. 3 is an enlarged, similarly presented, diagrammatic representation of that portion of FIG. 2 defined by the chain-line rectangle designated as "FIG. 3"

With particular reference, initially, to FIGS. 1 and 2, the improved hybrid transmission 10 may be driven by an engine 12. As shown, the engine 12 has an output shaft 14 that may be connected to the forward input member 16 of a transient torque damper 18. The forward input member 16 of the transient torque damper 18 may (as best seen in FIGS. 2 and 3) be secured, as by bolts 20, to a dynamically balanced rearward input member 22 such that both input members 16 and 22 rotate in unison in response to the rotation imparted by the output shaft 14 of the engine 12. Transient torque dampers are well known in this art, but irrespective of the particular transient torque damper 18 employed, the output member 24 thereof drives the input member 26 of the transmission 10, as will be hereinafter more fully described.

With continued reference to FIG. 3, the housing 28 of a positive displacement pump 30 may, as depicted, be secured in contiguous juxtaposition with the forward end plate 32 of the transmission housing 34, as by anchor bolts 36 that are anchored through the forward end plate 32 and into the forward edge on the frame portion 38 of the transmission housing 34. The stator 40 of a first motor/generator 42 is secured to the generally annular, interior surface 202 of the transmission housing frame 38.

The positive displacement pump 30 is the type that is commonly employed to distribute lubricating fluid though vehicular transmissions, and it may be driven either by the rearward input member 22 of the transient torque damper 18 or by the output member 24 thereof when a clutch (not shown but typically interposed between the engine 12 and the transmission 10—and which may be incorporated in the torque damper 18) is actuated to permit the transfer of power from the engine 12 to the transmission 10. When such a clutch is actuated to preclude the transmission of power from the engine 12 to the transmission 10 the lubricating pump 30 is driven by operation of the first and/or second motor/generators 42 and 286.

Irrespective of how the lubricating pump 30 is driven, the output member 24 of the transient torque damper 18 drives the input member 26 of the transmission 10, as by a spline connection 44 that operatively connects the output member 24 of the transient torque damper 18 to the transmission input member 26.

The transmission input member 26 includes a cylindrical shaft 46 that is receivable through an aperture 48 (FIG. 3) in the forward end plate 32 of the transmission housing 34. Interiorly of the transmission housing 34 the transmission input member 26 may have a continuing, axial extension 50 of cylindrical configuration but of modestly greater diameter than shaft portion 46. The continuing axial extension 50 surrounds a cylindrical pilot bore 52 into which the forward, pilot end 54 of the transmission main shaft 56 is received for relative rotation. The transmission input member 26 includes a bell portion 58 that flares radially outwardly from the axially inner portion of the continued axial extension 50 on the transmission input member 26.

In the embodiment depicted the engine 12 may be a fossil fuel engine, such as a diesel engine which is readily adapted to provide its available power output delivered at a constant number of revolutions per minute (RPM), as detailed in the aforesaid U.S. Pat. No. 5,931,757.

Irrespective of the means by which the engine 12 is connected to the transmission input member 26, the transmission input member 26 is operatively connected to a planetary gear subset 60 in the transmission 10. The first planetary gear subset 60 is the forward subset within the transmission 10 and serves as the engine power split planetary gear subset.

Figure 4:
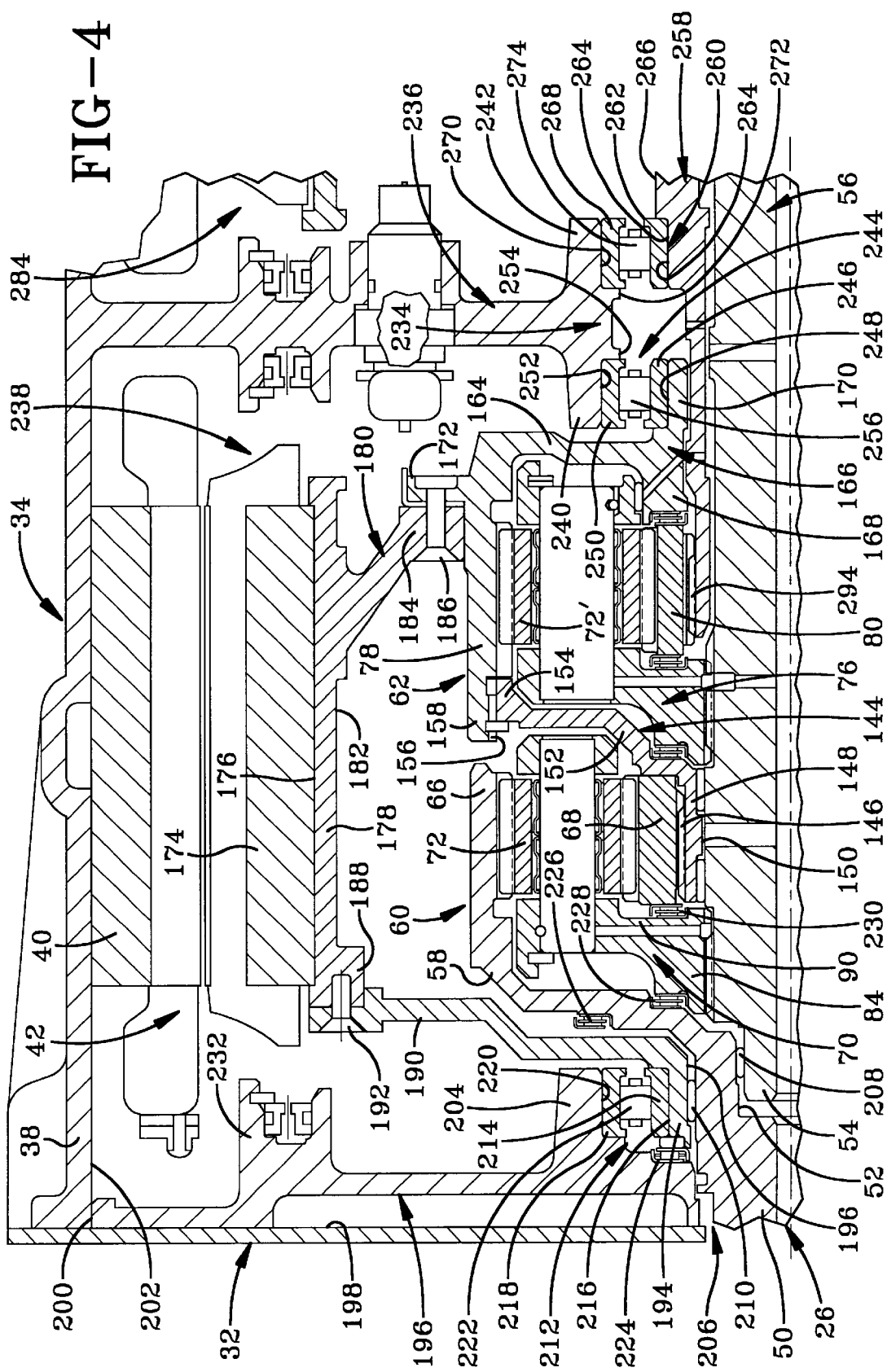
FIG. 4 is also an enlarged and similarly presented diagrammatic representation of that portion of FIG. 2 defined by the chain-line rectangle designated as "FIG. 4"
Figure 5:
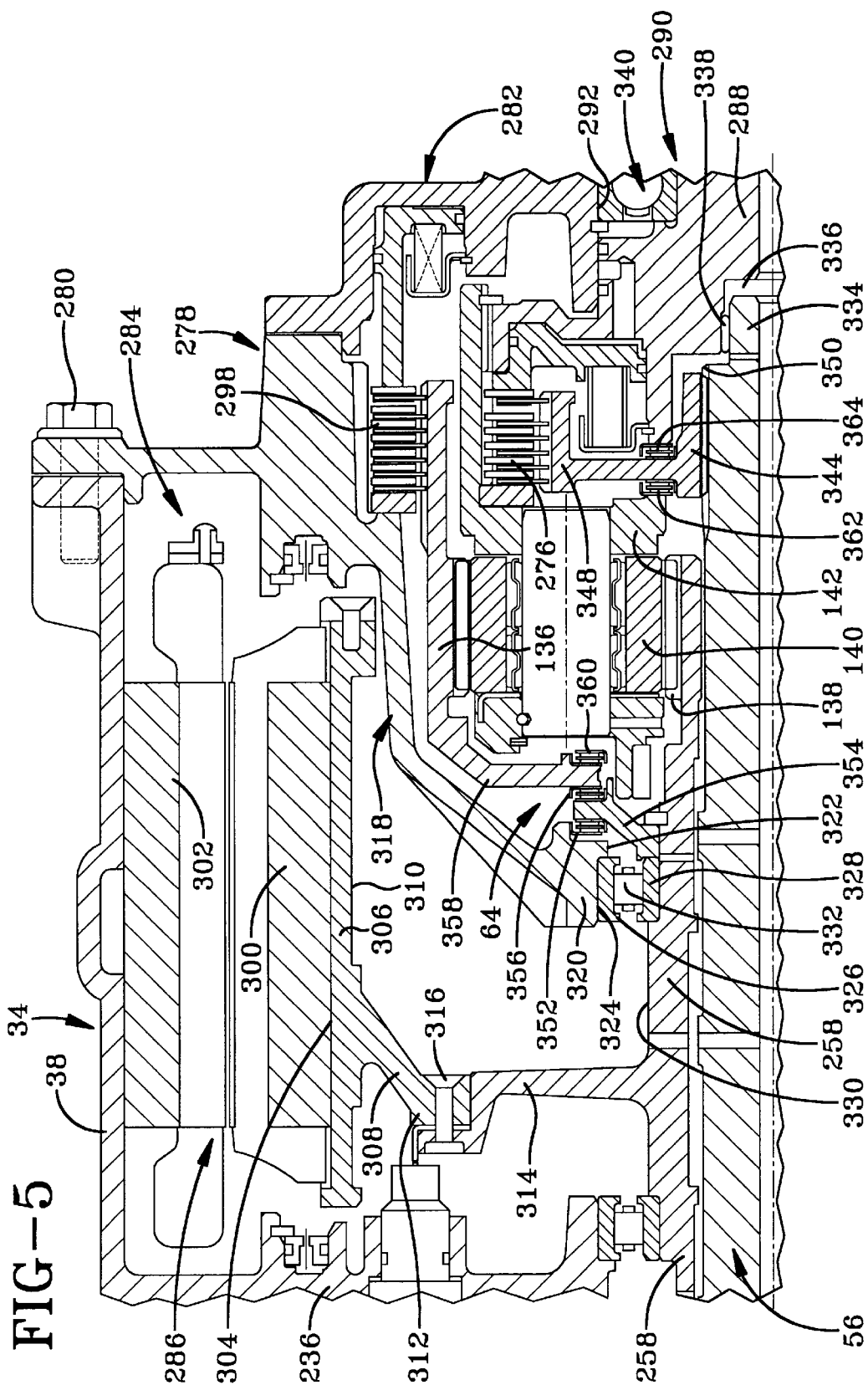
FIG. 5 is also an enlarged and similarly presented diagrammatic representation of that portion of FIG. 2 defined by the chain-line rectangle designated as "FIG. 5"

The hybrid transmission 10 utilizes three planetary gear subsets 60 (FIGS. 1–4), 62 (FIGS. 1, 2 & 4) and 64 (FIGS. 1, 2 & 5). The first planetary gear subset 60 employs an outer gear member 66, typically designated as the ring gear, that is presented from the circumferential interior of bell portion 58 on the transmission input member 26. The ring gear 66 circumscribes an inner gear member 68, typically designated as the sun gear. As is hereinafter described in greater detail and as is well depicted in FIGS. 6–9 and 11, a unique carrier cage assembly 70 rotatably supports a plurality—four are depicted—of planet gears 72 such that each planet gear 72A, 72B, 72C and 72D—which is rotatably mounted on an individual planet supporting shaft 74A, 74B, 74C and 74D—simultaneously, and meshingly, engages both the outer, ring gear member 66 and the inner, sun gear member 68 of the first planetary gear subset 60.

As appears in the foregoing paragraph, and as will appear in the detailed description that follows, a particular structural member, component or arrangement may be employed at more than one location. When referring generally to that type of structural member, component or arrangement a common numerical designation shall be employed. However, when one of the structural members, components or arrangements so identified is to be individually identified it shall be referenced by virtue of a letter suffix employed in combination with the numerical designation selected for general identification of that structural member, component or arrangement. Thus, there are four planet gears that are each generally identified by the numeral 72, but the four specific, individual, planet gears are, therefore, sequentially identified as 72A, 72B, 72C and 72D in the specification and on the drawings.

In some situations a structural element designated by a letter suffix in combination with its basic numerical designation may itself be employed at yet another location. In order to distinguish those elements, the second such element to be described will bear a prime symbol$^{(')}$. For example, there are four planet gears 72A–72D in carrier cage assembly 70 and also four planet gears 72A'–72D' in the hereinafter to be described carrier cage assembly 76 incorporated in planetary gear subset 62. These same suffix conventions shall be employed throughout the specification.

As best seen in FIGS. 1 & 4, the second planetary gear subset 62 also has an outer gear member 78, often also designated as the ring gear, that circumscribes an inner gear member 80, also often designated as the sun gear. As in the first planetary gear subset 60, a plurality of planet gears 72A'–72D'—four are depicted (See FIGS. 6, 7, 10 & 12)—in the second planetary gear subset 62 are also rotatably mounted in a carrier cage assembly 76 such that each planet gear member 72' simultaneously, and meshingly, engages both the outer, ring gear member 78 and the inner, sun gear member 80.

Before describing the third planetary gear subset 64, or the operative interconnection of the first, second and third planetary gear subsets 60, 62 and 64 with each other, and with the other components of the transmission 10, reference should be had to FIGS. 6–12 in conjunction with FIGS. 1 and 2 to understand the unique configuration of the carrier cage assemblies 70 and 76. As will become apparent, while the carrier cage assemblies 70 and 76 may be virtually identical, highly similar, but not identical, carrier cage assemblies 70 and 76 are depicted.

Figure 6:
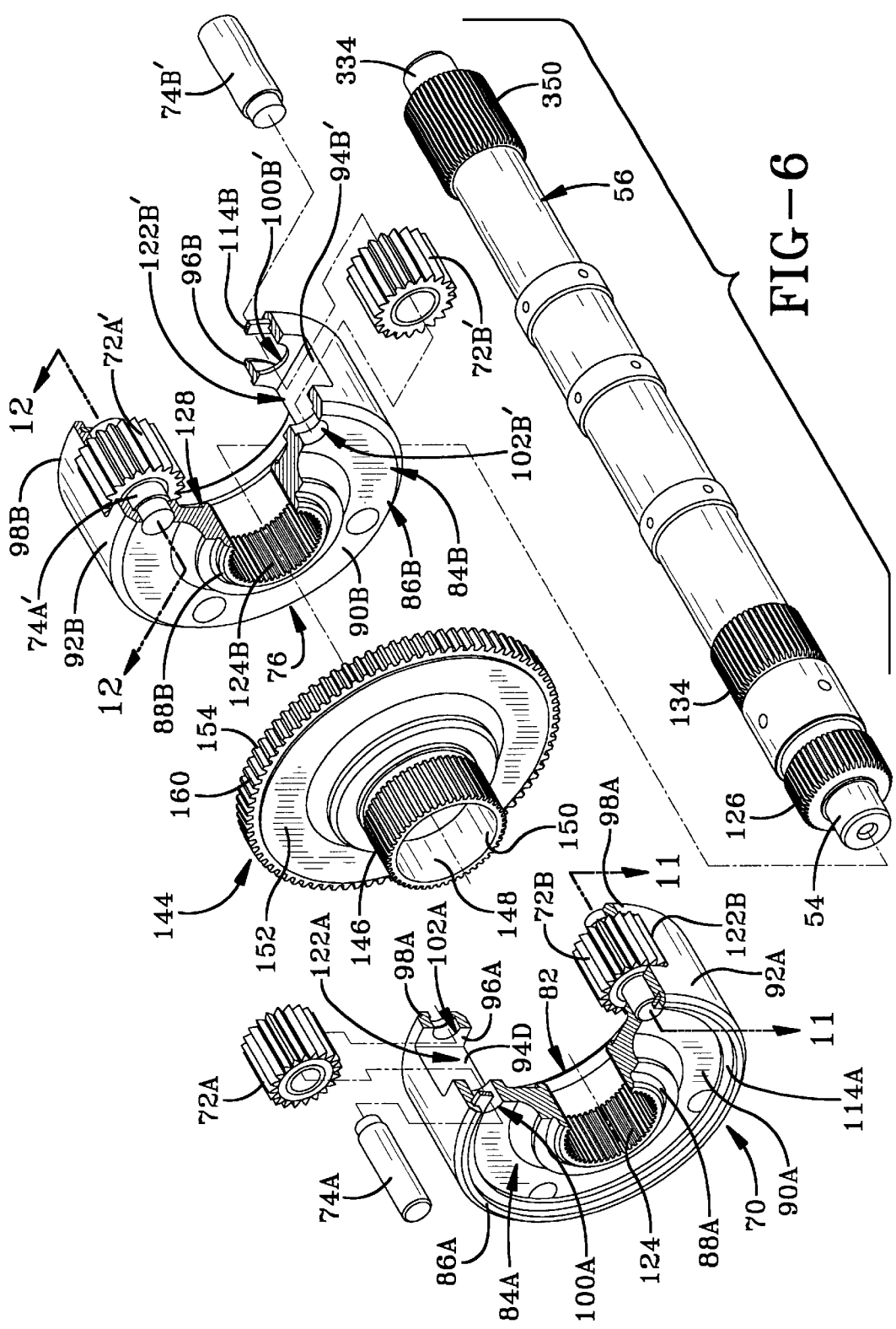
FIG. 6 is an exploded perspective of the uniquely configured carrier cage assemblies and the hub plate associated not only with the engine power split planetary gear subset (the forward planetary subset) but also the center planetary gear subset, both of said carrier cage assemblies being operatively secured to, and supported by, the main shaft that extends axially therethrough and which is also depicted in this figure.
Figure 7:
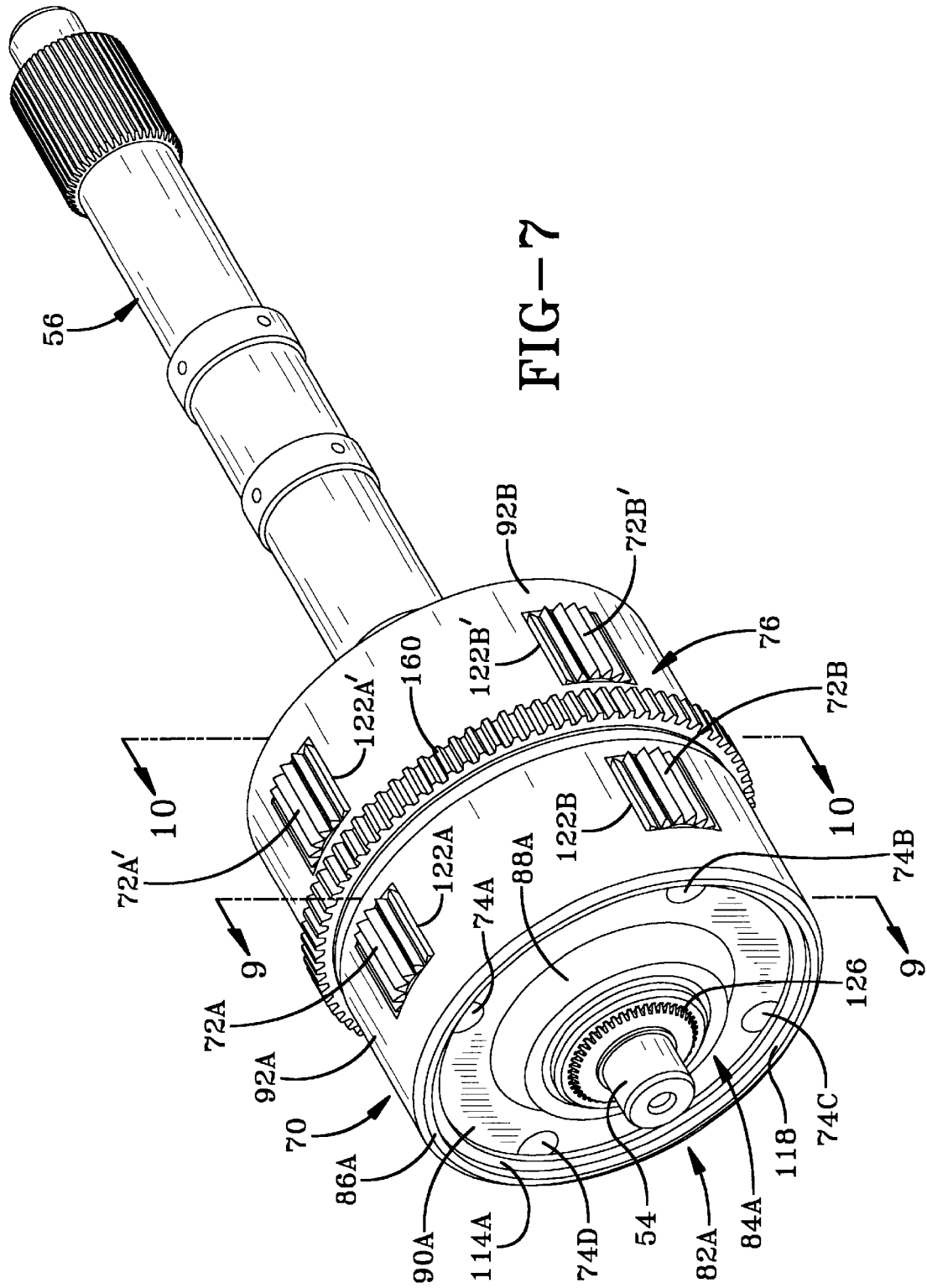
FIG. 7 is a perspective of the assembled structure that is depicted in exploded perspective in FIG. 6.
Figure 8:
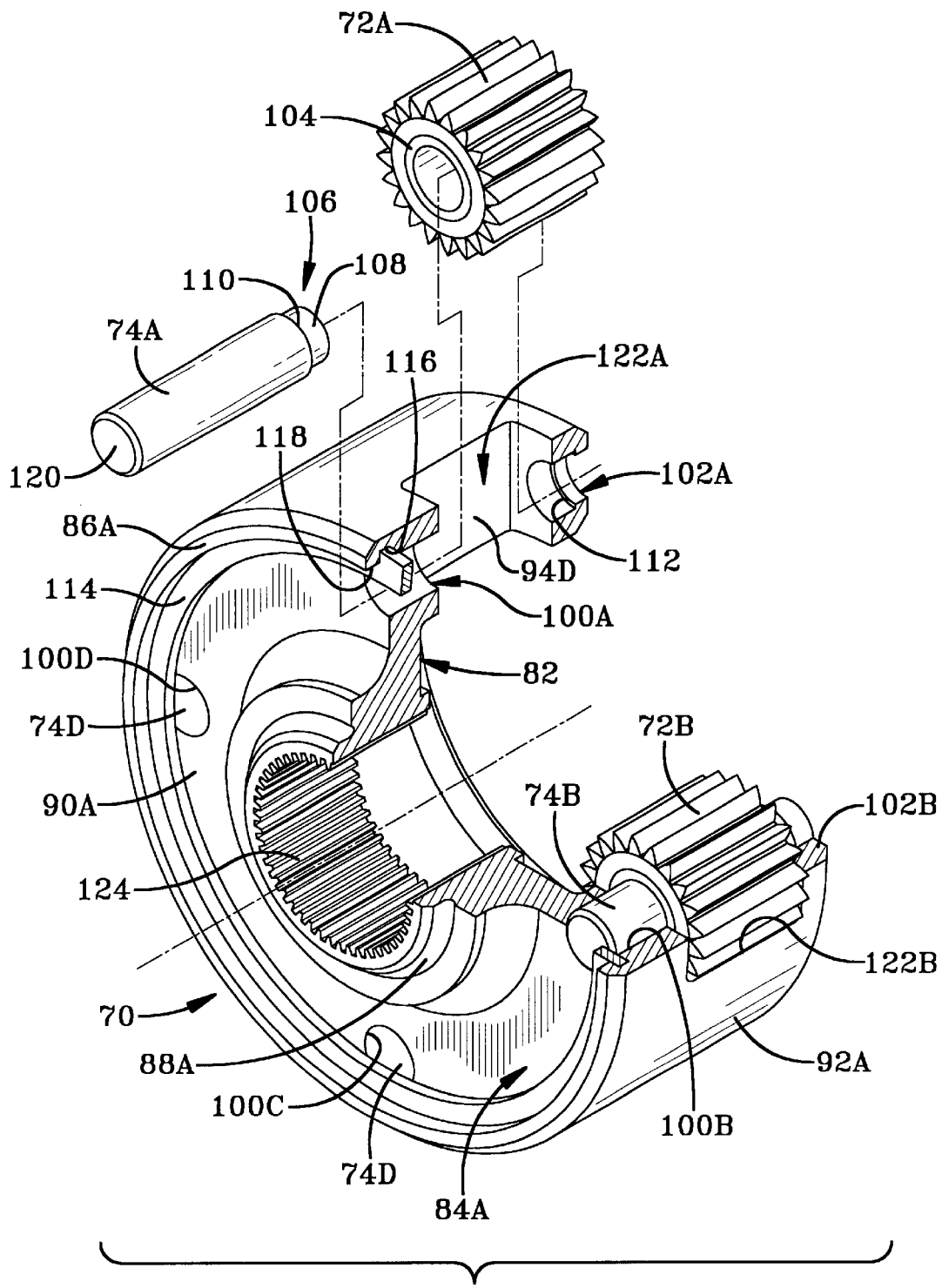
FIG. 8 is an enlarged portion of FIG. 6 depicting the partially broken away and partially sectioned carrier cage assembly associated with the engine power split, or forwardmost, planetary gear subset.
Figure 9:
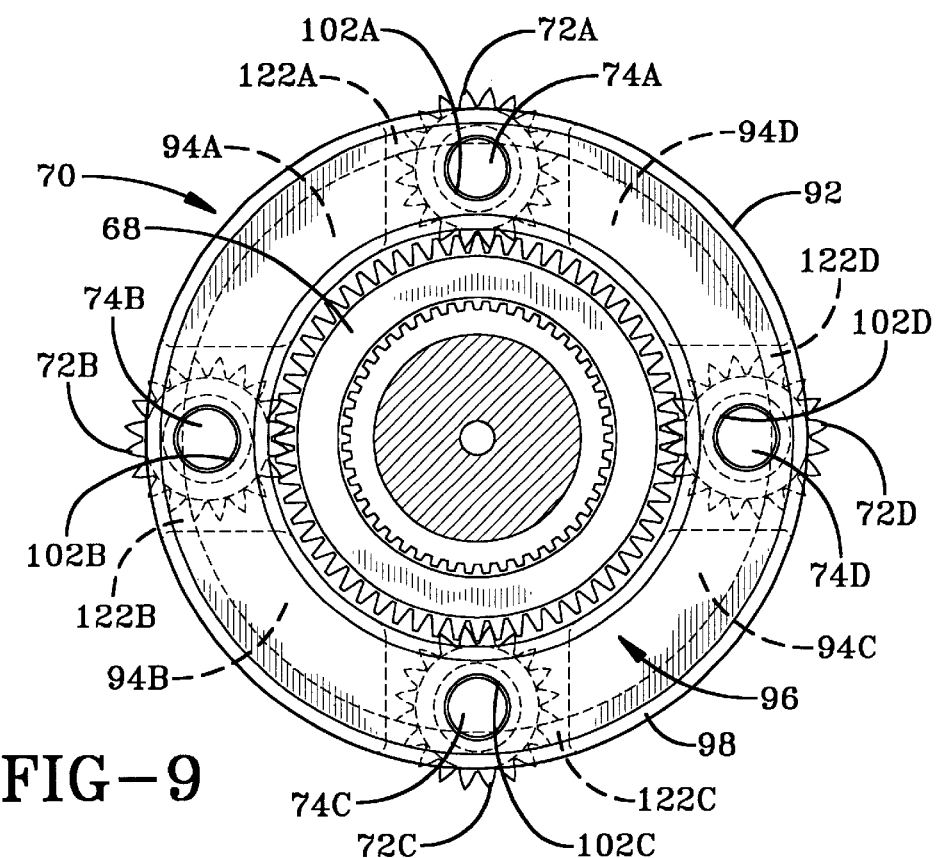
FIG. 9 is an enlarged transverse section taken substantially along line 9—9 of FIG. 7 and depicting that carrier cage assembly associated with the engine power split, or forward most, planetary gear subset in rear elevation.
Figure 10:
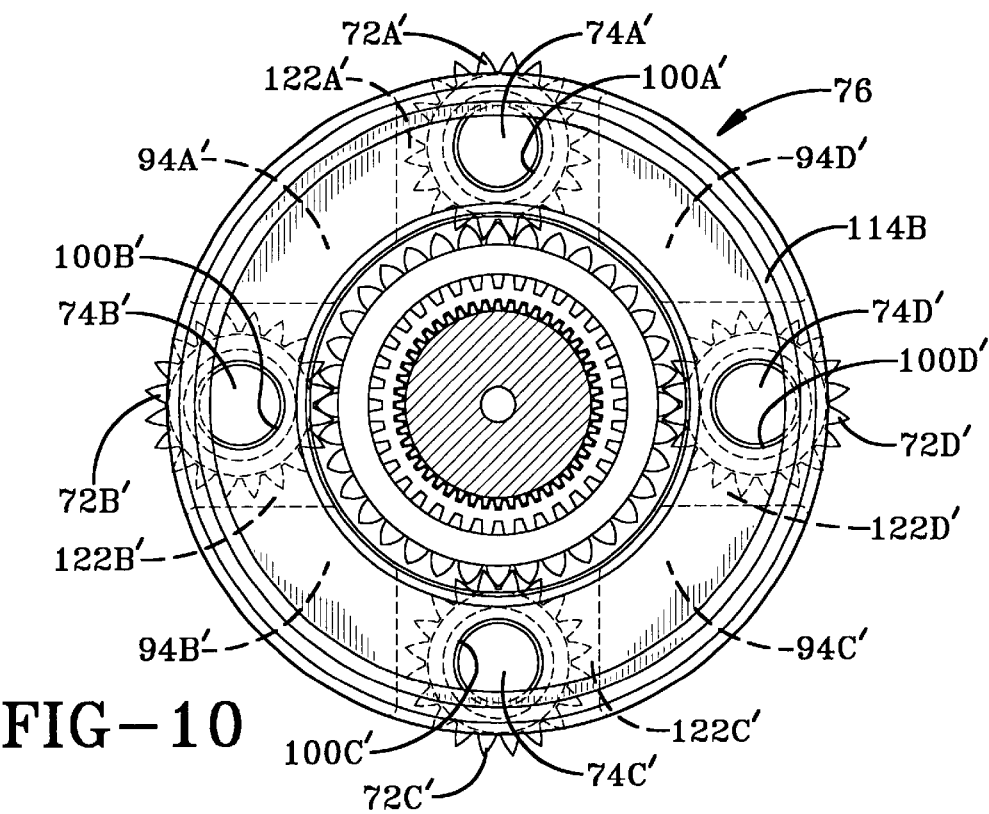
FIG. 10 is an enlarged transverse section taken substantially along line 10—10 of FIG. 7 and depicting that carrier cage assembly associated with the center planetary gear subset in rear elevation.

With reference, more particularly, to FIGS. 6–8, carrier cage assembly 70, employs a skeletal frame 82 in which the four planet gear support shafts 74A–74D are mounted, and the respective planet gears 72A–72D are rotatably received, one on each shaft 74A–74D.

The skeletal frame 82 (itself best seen in FIGS. 8 & 11) includes a radially oriented, rigid, bracing plate 84A. The bracing plate 84A presents a radially outer, annular rim 86A and a radially inner, central hub 88A. A radially oriented web portion 90A extends between, and serves to join, the annular, outer rim 86A to the central hub 88A.

An annulus 92A extends rearwardly from the bracing plate 84A in axial alignment with the annular, outer rim 86A. One or more—four as depicted—cantilevered ribs 94A–94D may also extend rearwardly from the web portion 90A of the bracing plate 84A. The ribs 94 are disposed to engage, or as represented, to be integrally formed with, the annulus 92A and thereby structurally to reinforce the annulus 92A as well as to support a rim flange 96A located in proximity to the transverse plane defined by the rearward extremity 98A of the annulus 92A.

The rim flange 96A may well be the unified, annular configuration depicted, or the rim flange 96A may be circumferentially segmented with the segments individually supported from the reinforcing ribs 94 and/or the annulus 92A in the carrier cage assembly 70. Irrespective of whether the rim flange 96A is comprised of a plurality of individual components or the unified annular configuration depicted, the overriding consideration is that the rim flange 96A contribute to the desired stability to the planet gear supporting shafts 74 engaged therewith.

As shown, the planet gear support shafts 74 extend between, and are supported by, the bracing plate 84A and the axially spaced rim flange 96A.

Figure 11:
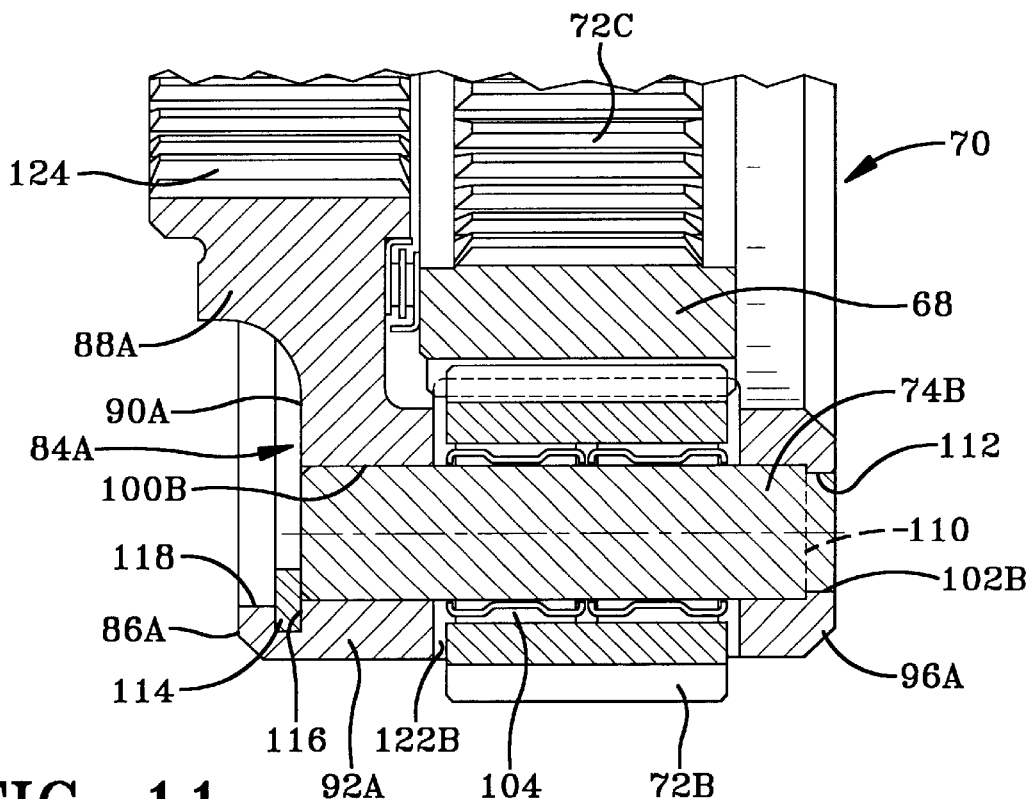
FIG. 11 is an enlarged, longitudinal section taken substantially along line 11—11 of FIG. 6 to depict a cross section of the generally toroidal skeletal frame of the carrier cage assembly associated with the engine power split planetary gear subset and one of the planet gears on the supporting shaft for that planet gear; and, FIG. 12 is an enlarged, longitudinal section taken substantially along line 12—12 of FIG. 6 to depict a cross section of the generally toroidal skeletal frame of the carrier cage assembly associated with the center planetary gear subset and one of the planet gears and the supporting shaft for that planet gear.
Figure 12:
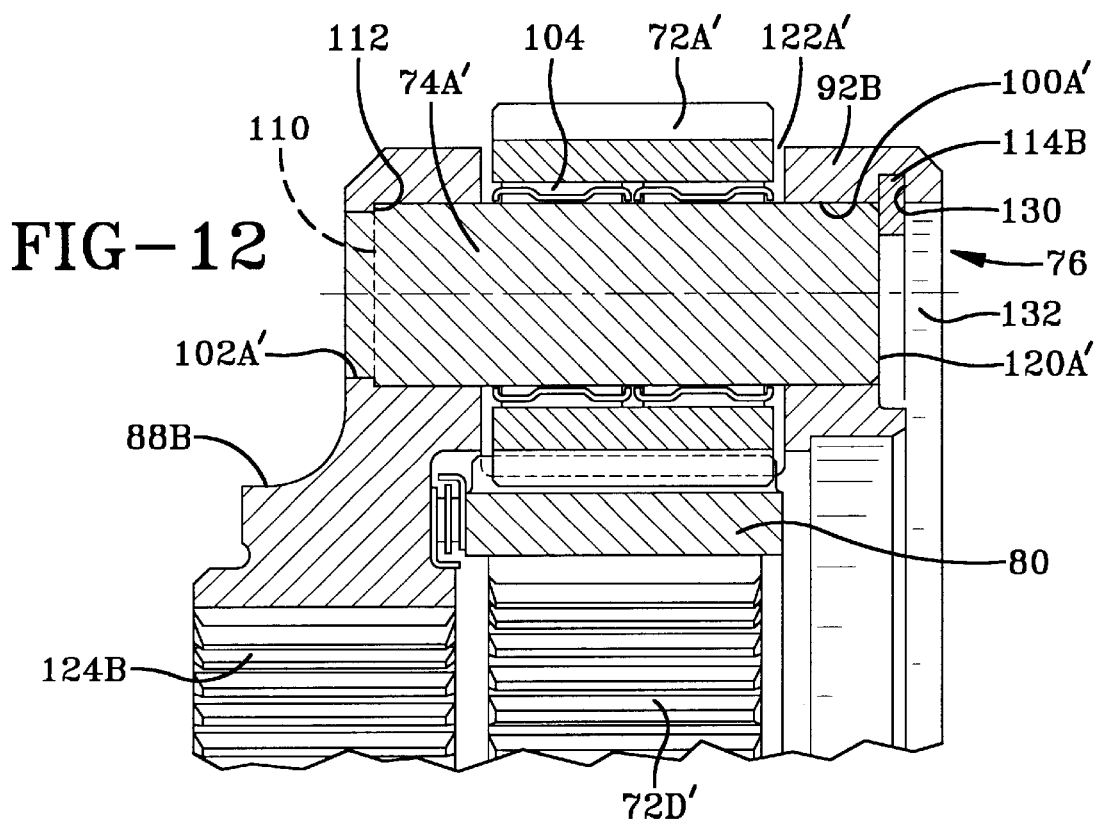

As best depicted in FIGS. 8 and 11, if four planet gear support shafts 74A–74D are employed in carrier cage assembly 70, one end portion of each such support shaft 74A–74D may be physically received within the corresponding four receiving bores 100A, 100B, 100C and 100D that penetrate the web portion 90A of the bracing plate 84A in proximity to the annular outer rim 86A. The receiving bores 100A–100D are disposed in axial opposition to four anchor bores 102A–102D that are provided in the rim flange 96A, and the other end portion of each of the four planet gear support shafts 74A–74D (the end portion not received in the receiving bores 100A–100D) are physically received within the respective anchor bores 102A–102D.

To contribute to the dynamic stability of the carrier cage assembly 70, it is preferable to have the planet gear support shafts 74 incrementally spaced circumferentially about the carrier cage assembly 70. Hence, because four planet gears 72A–72D are disclosed in the carrier cage assembly 70, their individual supporting shafts 74A–74D are preferably spaced at approximately 90° intervals along the circumference of the annulus 92A. As such, the receiving bores 100A–100D as well as the opposed anchor bores 102A–102D are also circumferentially spaced at approximately 90° intervals.

As shown, a bushing 104 may be interposed between each planet gear 72 and the planet gear supporting shaft 74 on which the planet gear 72 is rotatably mounted.

Some means should also be provided to preclude each planet gear supporting shaft 74 from axial translation and thereby maintain the planet gears 72 mounted thereon from inadvertent axial translation.

For example, one end portion 106 of each planet gear supporting shaft 74 may be tapered or, as shown in FIG. 8, relieved as at 108 to provide a shoulder 110 that matingly engages a corresponding shoulder 112 within the each respective anchor bore 102. Engagement of the respective shoulders 110A–110D and 112A–112D precludes movement of each planet gear support shaft 74A–74D rearwardly in carrier cage assembly 70 (to the right as viewed in FIGS. 6 and 8).

One structural arrangement by which to preclude displacement of the planet gear support shafts 74 in the direction opposite to that precluded by engagement of the shoulders 110 and 112 is to employ a helical spring clip 114A in each carrier cage assembly 70 that may be selectively received within an annular groove 116 on the radially inner surface 118 of the outer rim 86A adjacent the radially outer extremity of the bracing plate 84A. When the spring clip 114A is received in the aforesaid annular groove 116 it engages transverse end surface 120 on that end portion of the planet gear supporting shaft 74 that extends through the receiving bore 100 in the web portion 90A of the bracing plate 84A.

Irrespective of how the planet gear support shafts 74 are themselves supported, the annulus 92A is provided with a plurality of access apertures 122A–122D—preferably one access aperture 122 for each planet gear 72—to permit unrestricted meshing engagement of each planet gear 72 in carrier cage assembly 70 with the ring gear 66 of the first planetary gear subset 60, which ring gear, as noted previously herein, is located on the circumferential interior of the bell portion 58 presented from the transmission input member 26.

The planet gears 72 of the first planetary gear subset 60 also continuously mesh with the sun gear 68.

Unrestricted meshing engagement of the planet gears 72 with the ring gear 66 and the sun gear 68 also requires that the ribs 94 be spaced to preclude inadvertent engagement with the planet gears 72. When four planet gears 72A–72D are supported on four planet supporting shafts 74A–74D circumferentially spaced at 90° increments, spacing the ribs 94A–94D at 90° increments so they are offset 45° from each planet supporting shaft 74 obviates any undesired interference with rotation of the planet gears 72.

Before discussing the structure from which the sun gear 68 is presented it should be noted that the interior of the central hub portion 88A of the carrier cage assembly 70 presents spline teeth 124 to engage opposing spline teeth 126 on the transmission main shaft 56 to assure that the carrier cage assembly 70 always rotates in unison with the transmission main shaft 56.

Turning now to carrier cage assembly 76 (FIGS. 4, 6 and 10), it should be understood that the skeletal frame 128 differs from the skeletal frame 82 in carrier cage assembly 70 in that the receiving bores 100A'–100D' penetrate the rim flange 96B in carrier cage assembly 76 rather than the web portion 90B, as in carrier cage assembly 70. Accordingly, the anchor bores 102A'–102D' penetrate the web portion 90B of skeletal frame 128 in carrier cage assembly 76 rather than the rim flange 96B, as they would if carrier cage assembly 76 were identical to carrier cage assembly 70. With this swapped location of the receiving bores 100A'–100D' and the anchor bores 102A'–102D', axial translation of the planet supporting shafts 74A'–74D' requires that the planet supporting shafts 74A'–74D' be reversed 180° from their orientation in carrier cage assembly 70.

In conformity therewith, one end portion 106A'–106D' of each planet gear supporting shaft 74A'–74D' may be tapered or, as shown in FIG. 6, relieved as at 108A'–108D' to provide a shoulder 110A'–110D' on each respective planet gear supporting shaft 74A'–74D' that matingly engages an opposed shoulder 112A'–112D' within the respective anchor bore 102A'–102D'. Engagement of the aforesaid shoulders 110 and 112 precludes movement of each planet gear support shaft 74A'–74D' forwardly in carrier cage assembly 76 (to the left as viewed in FIGS. 6 and 7).

Similarly, a suitable structural arrangement by which to preclude displacement of the planet gear support shafts 74A'–74D' in the direction opposite to that precluded by engagement of the shoulders 110 and 112 may comprise a helical spring clip 114B that may be selectively received within an annular groove 130 on the radially inner surface 132 of the annulus 92B adjacent the extremity 98B thereof. When the spring clip 114B is received in the aforesaid annular groove 128 it simultaneously engages the transverse end surfaces 120A'–120D' on that end portion of each planet gear supporting shaft 74 that extends through its respective receiving bore 100 in the rim flange 96B of the carrier cage assembly 76.

As in carrier cage assembly 70, irrespective of how the planet gear supporting shafts 74 are themselves supported, the annulus 92B is provided with a plurality of access apertures 122A'–122D'—preferably one access aperture 122 for each planet gear 72—to permit unrestricted meshing engagement of each planet gear 72 in carrier cage assembly 76 with the outer, ring gear 78 of the second planetary gear subset 62, which ring gear will be hereinafter more fully described.

The planet gears 72 of the second planetary gear subset 62 also continuously mesh with the inner, sun gear 80 which will also be hereinafter more fully described.

In carrier cage assembly 76, as well, one or more—also four, as depicted—cantilevered ribs 94A'–94D' extend between the bracing plate 84B and the rim flange 96B to provide assurance that the annulus 92B has sufficient hoop strength. The same incremental spacing of the planet gear supporting shafts 74A'–74D' and the ribs 94A'–94D' may be employed as in carrier cage assembly 70.

It should be noted that the interior of the central hub portion 88B of the carrier cage assembly 76 presents spline teeth 124B, to engage opposing spline teeth 134 on the transmission main shaft 56 to assure that the carrier cage assembly 76 also always rotates in unison with the transmission main shaft 56.

Before continuing with the structural details as to how each of the various planetary gear subsets are compounded, it should be understood that the third planetary gear subset 64 (as seen in FIGS. 1, 2 & 5) also has an outer, ring, gear member 136 which circumscribes an inner, sun, gear member 138 (as best represented in FIG. 5). A plurality of planet gear members 140 are rotatably mounted on a more conventional carrier 142 such that each planet gear 140 meshingly engages both the outer, ring gear member 136 and the inner gear member 138.

Returning now to the sun gear 68, it should be understood that whereas all three planetary gear subsets 60, 62 and 64 are "simple" planetary gear subsets in their own right, the first and second planetary gear subsets 60 and 62 are compounded in that the inner, sun gear 68 of the first planetary gear subset 60 is conjoined, as through a hub plate 144 (FIGS. 1 & 4), to the outer, or ring, gear 78 of the second planetary gear subset 62. In fact, the inner, or sun, gear 68 of the first planetary gear subset 60 is an annular member the cylindrical, exterior surface of which meshingly engages the planet gears 72A–72D. The cylindrical interior surface of the inner, sun gear 68 is operatively connected, as by a spline connection 146 to the cylindrical exterior of the hub portion 148 located at the radially inner extremity of the of hub plate 144 (FIG. 6). The annular interior surface 150 of hub portion 148 circumscribes the exterior of the transmission main shaft 56. The plate portion 152 of the hub plate 144 extends radially outwardly from the hub portion 148 and terminates in an axially extending, annular lip 154, the exterior surface of which is operatively connected to the radially inner surface 156 of an annular, axial extension 158 of the outer, ring gear 78 in the second planetary gear subset 62, as by the meshingly engaged spline teeth 160 (FIG. 6) on the lip 154 of hub plate 144 with the spline teeth 162 (FIG. 4) on the radially inner surface 156 of the axial extension 158 of the outer, ring gear 78.

With continued reference to FIG. 4, the ring gear 78 extends forwardly from a radially oriented first balance plate 164 that terminates in a radially inner, annular, grounding connector 166 which presents forwardly, and rearwardly, extending portions 168 and 170, respectively, the purpose of which will be hereinafter more fully explained.

A joinder flange 172 extends circumferentially of the juncture between the outer, ring gear 78 and the balance plate 164 to provide a rigid connection with the rotor 174 of the first motor/generator 42. Specifically, the rotor 174 is secured to the exterior surface 176 of an annular support plate 178. A conical connector 180 is secured to, or, as depicted, may be integrally joined to the annular inner surface 182 of the support plate 178. The conical connector 180 is disposed to extend radially inwardly and axially rearwardly to terminate in an annular fastening rim 184 that may be secured to the circumferential joinder flange 172 by a plurality of fasteners 186 such as, for example, rivets or machine screws.

The forward end portion 188 of the annular support plate 178 for the rotor 174 is secured to a second balance plate 190 with a plurality of fasteners 192 which may, for example, also be rivets or machine screws.

A grounding connector that may be in the form of a collar 194 at the radially inner end of the balance plate 190 circumscribes the extension 50 of the input member 26.

A grounding plate 196 may be positioned adjacent the interior surface 198 on the forward end plate 32 of the transmission housing 34. The radially outer edge 200 of the grounding plate 196 may be supported against the annular interior surface 202 on the frame 38 (the same surface to which the stator 40 of the first motor/generator 42 is secured) of the transmission housing 34. A hub 204 extends rearwardly from the grounding plate 196 to circumscribe the grounding connector collar 194 on the second balance plate 190. The hub 204 is, therefore, conveniently located coaxially of a central bore 206 the penetrates the grounding plate 196. The axially extending shaft portion 50 of the transmission input member 26 rotates within the central bore 206.

The transmission main shaft 56, the axial extension 50 of the input member 26 and the second balance plate 190 are grounded to the transmission housing 34 through the hub 204. At this point it should be noted that the term "grounded" has two distinctly different meanings in this art. Specifically, the preceding usage connotes that the member is rotatably supported by one or more relatively stationary members such that lateral movement is inhibited without detracting from the desired rotation. To obviate confusion, when the foregoing definition is intended the terminology "laterally grounded" shall be employed.

The second meaning connotes that the grounded member is secured against rotation by an operative connection to a non-rotatable member. To obviate confusion, when this second definition is intended the terminology "rotatably grounded" shall be employed.

Returning to the description of the disclosed embodiment, the transmission main shaft 56, the axial extension 50 of the input member 26 and the second balance plate 190 are laterally grounded to the housing 34 by the use of a series of bearing means interposed between the laterally grounded members and the grounding plate 196 which remains laterally immobile by virtue of the engaging interaction between the radially outer edge 200 of the grounding plate 196 to the annular interior surface 202 of the transmission housing 34.

With specific reference, then, to FIGS. 3 & 4, the bearing means interposed between the pilot end 54 of the transmission main shaft 56 and the pilot bore 52 in the transmission input member 26 may comprise a bushing 208. The bearing means interposed between the axial extension 50 of the transmission input member 26 and the grounding connector collar 194 may comprise another bushing 210.

The bearing assembly 212 interposed between the annular grounding collar connector 194 on the second balance plate 190 and the hub 204 may comprise a race 214 secured to the radially outer, annular surface 216 of the annular grounding collar connector 194 that is opposed by a race 218 that may be secured to the inner surface 220 of the hub 204. A plurality of cylindrical bearing members 222 are rotatably interposed between the races 214 and 218.

The desired lateral grounding of the rotatable members of the first planetary gear subset 60, the input member 26 and that portion of the main shaft 56 which engages the input member 26 as well as the balance plate 190 is achieved by: the aforesaid bearing means in the nature of the bushing 208 operatively interposed between the relatively rotatable main shaft 56 and the input member 26; the bearing means in the nature of the bushing 210 operatively interposed between the input member 26 and the connecting collar 194 on the second balance plate 190; and, the bearing assembly 212 operatively interposed between the connecting collar 194 on the second balance plate 190 and the hub 204 on the grounding plate 196.

Further stability (and thus a reduction in vibrations) may be achieved by longitudinally grounding even those rotating members in the transmission that are laterally grounded. Specifically, longitudinal grounding may be achieved by the astute use of thrust bearings. For example, one may advantageously insert a thrust bearing 224 between the connector collar 194 and that portion of the grounding plate 196 that is adjacent the bore 206. A second thrust bearing 226 may be operatively interposed between the second balance plate 190 and the bell portion 58 of the input member 26. A third thrust bearing 228 may be operatively interposed between the bell portion 58 of the input member 26 and the central hub 88 of the bracing plate 84 in the carrier cage assembly 70. A fourth thrust bearing 230 may be operatively interposed between the inner, sun, gear 68 of the first, or engine power split planetary gear subset 60 and the web portion 90 of the bracing plate 84 in carrier cage assembly 70.

Although unassociated with the stability of the rotating members associated with the first motor/generator 42, the input member 26 and the first planetary gear subset 60, a plurality of spray nozzles 232 may also be mounted on, or included in, the structure of the grounding plate 196 to cool and/or lubricate the aforesaid rotating members.

The rearwardly directed portion 170 of the grounding connector 166 is spaced radially inwardly from an annular, grounding collar 234 presented at the radially inner extremity of a grounding partition 236 that extends radially inwardly from the annular interior surface 202 of the transmission housing frame 38 at the longitudinally medial portion thereof. That portion of the cylindrical interior of the transmission housing 34 that is located between the grounding plate 196 and the grounding partition 236 comprises a forward compartment 238. The forward compartment 238 houses the first motor/generator 42, the first and second planetary gear subsets 60 and 62, respectively, as well as the hereinbefore described interconnecting structures that operatively connect the motor/generator 42 and the planetary gear subsets 60 and 62.

The annular grounding collar 234 presents forwardly and rearwardly extending portions 240 and 242, respectively. An annular bearing assembly 244 is interposed between the forwardly extending portion 240 of the grounding collar 234 and the rearwardly directed portion 170 of the grounding member 166 which contributes to the stability of: the inner, sun gear 68 of the engine power split planetary gear subset 60; the outer, ring gear 78 of the central planetary gear subset 62 (by virtue of the compounding interconnection thereof achieved with the hub plate 144); and, the rotor 174 of the first motor/generator 42—all against undesirable lateral movements. With continued reference to FIG. 4, the bearing assembly 244 may well comprise a race 246 secured to an annular outer shelf 248 provided on the rearwardly extending portion 170 of the grounding connector 166 that is disposed in opposition to a race 250 provided on the opposed annular recess 252 in the annular interior surface 254 of the forwardly extending portion 240 of the grounding collar 234. A plurality of cylindrical bearings 256 may engage the opposed races 246 and 250.

As also depicted in FIG. 4, it will be seen that a sleeve shaft 258 also circumscribes the transmission main shaft 56 and is interposed between the main shaft 56 and the interior of the grounding connector 166 which comprises the inner terminus of the balance plate 164 such that all three structural elements—i.e.: the main shaft 56, the sleeve shaft 258 and the grounding connector 166—are relatively rotatable with respect to each other.

To contribute to the lateral grounding of the sleeve shaft 258 while providing for the desired rotation thereof, a bearing assembly 260 may be interposed between the sleeve shaft 258 and the grounding partition 236 in the forward compartment 238. Specifically, the bearing assembly 260 may well comprise a race 262 secured to an annular outer shelf 264 provided on exterior surface 266 of the sleeve shaft 258 that is disposed in opposition to a race 268 provided on the opposed annular recess 270 in the annular interior surface 272 of the rearwardly extending portion 242 of the grounding collar 234 presented from the grounding partition 236. A plurality of cylindrical bearings 274 may rotatably engage the opposed races 262 and 268.

The planetary gear subsets 60 and 62 are further compounded in that the carrier 70 of the first planetary gear subset 60 is conjoined, as through the transmission main shaft 56, to the carrier 76 of the second planetary gear subset 62. It should be remembered that the spline teeth 124 (FIG. 6) on carrier cage assembly 70 engage the teeth 126 on transmission main shaft 56 and that the spline teeth 124B on carrier cage assembly 76 engage the teeth 134 on the transmission main shaft 56. As best seen in FIG. 5, the shaft 56 is also selectively connected to the carrier 142 of the third planetary gear subset 64, as through a torque transfer device 276 which is employed to assist in the selection of the operational modes of the hybrid transmission 10.

With continued reference to FIG. 5, it should be noted that a rear grounding member 278 may be secured to the frame 38 of the transmission housing 34 by a plurality of bolts 280, and a closure assembly 282 may be supported from the grounding member 278. Returning now to FIG. 2 it will be observed that the portion of the cylindrical interior of the transmission housing 34 which is located between the medially located grounding plate 236 and the rear closure assembly 282 comprises a rear compartment 284. The rear compartment 284 houses: the third planetary gear subset 64, a second motor/generator 286, a portion of the main shaft 56; and, a connecting extension 288 of the output member 290. The connecting extension 288 extends into the rear compartment 284 through a bore 292 that penetrates the closure assembly 282.

Referring again to FIG. 5, the carrier 142 of the third planetary gear subset 64 is connected directly to the connecting extension 288 of the transmission output member 290. When the hybrid transmission 10 is used in a land vehicle, the output member 290 may be connected to the vehicular axles (not shown) that may, in turn, terminate in the drive members (also not shown). The drive members may be either front or rear wheels of the vehicle on which they are employed, or they may be the drive gear of a track vehicle.

The inner, sun gear 80 of the second planetary gear subset 62 is connected to the inner, sun gear 138 of the third planetary gear subset 64, as through the sleeve shaft 258 that circumscribes the transmission main shaft 56. As best seen in FIG. 4, the sun gear 80 may be operatively connected to the sleeve shaft 258 by a spline connection 294. Similarly, and as best seen in FIG. 5, the sun gear 138 may, as best shown in FIG. 5, be integral with, and presented from, the sleeve shaft 258. The outer, ring, gear 136 of the third planetary gear subset 64 is rotatably grounded by a torque transfer device 298 that selectively connects the ring gear 136 to the transmission housing 34. As such, the torque transfer device 298 selectively effects rotational grounding of the ring gear 136. Torque transfer device 298 is also employed to assist in the selection of the operational modes of the hybrid transmission 10.

The sleeve shaft 258 is also continuously connected to the rotor 300 of a second motor/generator 286. The stator 302 of the second motor/generator 286 may be secured to the generally annular, interior surface 202 of the transmission housing frame portion 38 in a manner similar to that by which the stator 40 of the first motor/generator 42 is so secured.

All the planetary gear subsets 60, 62 and 64 as well as the two motor/generators 42 and 286 are coaxially oriented, as about the axially disposed transmission main shaft 56. It should be noted that both motor/generators 42 and 286 are of an annular configuration which permits them to circumscribe the three planetary gear subsets 60, 62 and 64 such that the planetary gear subsets 60, 62 and 64 are disposed radially inwardly of the motor/generators 42 and 286. This configuration assures that the overall envelope—i.e.: the circumferential dimension—of the transmission 10 is minimized. More specifically, the planetary gear subsets 60 and 62—which are the most subject to dynamic loading when receiving input power, as from the engine 12 and/or the first motor generator 42, and therefore the most subject to undesirable vibrations are located concentrically inward of the first motor/generator 42.

As was previously noted with respect to the available power output and RPM of the engine 12, the details of the horsepower output of the first and second motor/generators 42 and 286 are also not critical to the invention, but for the purpose of effecting an absolutely clear understanding of the hybrid transmission 10 one may refer to U.S. Pat. No. 5,931,757, for an exemplary maximum speed for motor/generators having a desired continuous horsepower rating.

Before further describing the power sources which are available to the transmission 10 it should be understood that certain other important support means may be employed to assure minimization of vibrations induced by lateral movement of the dynamic members within the rear compartment 284 of the transmission 10.

For example, the rotor 300 of the second motor/generator 286 is secured to the exterior surface 304 of an annular support plate 306. A conical connector 308 is secured to, or, as depicted, may be integrally joined to the annular inner surface 310 of the annular support plate 306 and flares radially inwardly and axially rearwardly to terminate in a fastening rim 312. A connecting flange 314 extends radially outwardly from the sleeve shaft 258 and is secured, as by machine screws 316, to the fastening rim 312. As such, the sleeve shaft 258 always rotates in unison with the rotor 300 of the second motor/generator 286.

A grounding member 318 angles axially forwardly and then radially inwardly from the rear grounding member 278 to terminate in a grounding collar 320. The radially inner, annular surface 322 of the collar 320 is recessed, as at 324, to receive a race 326. An opposed race 328 is presented from the annular exterior 330 of the sleeve shaft 258, and a plurality of cylindrical bearings 332 are received within the opposed races 326 and 328 to permit rotation of the sleeve shaft 258 and yet contribute to the lateral grounding thereof.

A pilot extension 334 extends rearwardly from the transmission main shaft 56 to be received in an opposed pilot bore 336 in the connecting extension 288 of the transmission output member 290. A bushing 338 is interposed between the relatively rotatable pilot extension 334 and the pilot bore 336. A ball bearing assembly 340 is interposed between the exterior of the connecting extension 288 and the closure assembly 282 to effect direct lateral grounding of the connecting extension 288 to the transmission housing 34 and thereby effect indirect lateral grounding of the transmission main shaft 56 through the connecting extension 288 to the transmission housing 34.

The radially inner hub 342 of a transfer collar 344 is secured to the transmission main shaft 56 by teeth 346 on the hub 342 that engages teeth 348 on the transmission main shaft 56, and the radially outer rim 350 of the transfer collar 344 is selectively connected to the carrier 142 of the third planetary gear subset 64, as through the aforesaid torque transfer device 276.

A plurality of thrust bearings may be advantageously interposed between selected structural members within the rear compartment 284 to effect longitudinal grounding of those rotatable members heretofore described as being laterally grounded. Specifically, thrust bearing 352 may be interposed between the collar 320 of the ground member 318 and a reactive flange 354 that extends radially outwardly from the sleeve shaft 258. A second thrust bearing 356 may be interposed between the radial reactive flange 354 and a locating rim 358 that extends radially inwardly from the ring gear 136 of the third planetary gear subset 64. A third thrust bearing 360 may be interposed between the locating rim 358 and the carrier 142 of the third planetary gear subset 64. A fourth thrust bearing 362 may be interposed between the carrier 142 and the transfer collar 344, and a fifth thrust bearing 364 may be interposed between the transfer collar 344 and the connecting extension 288 of the output member 290.

Returning now to the description of the power sources, it should be apparent from the foregoing description, and with particular reference to FIG. 1, that the transmission 10 selectively receives power from the engine 14. As will now be explained, the hybrid transmission also receives power from an electric storage device 366. The electric storage device 366 may be one or more batteries. Other electric storage devices that have the ability to store electric power and dispense electric power may be used in place of the batteries without altering the concepts of the present invention. As was explained in conjunction with the description of the engine 14 and the motor/generators 42 and 286, it must similarly be understood that the horsepower output of the electrical storage device 366 is also not critical to the invention, and here, too, an exemplary horsepower rating may be found in the aforesaid pending U.S. patent application.

The electric storage device 366 communicates with an electrical control unit (ECU) 368 by transfer conductors 370A and 370B. The ECU 368 communicates with the first motor/generator 42 by transfer conductors 370C and 370D, and the ECU 368 similarly communicates with the second motor/generator 286 by transfer conductors 370E and 370F.

Operation of the Exemplary Preferred Embodiment

Introduction

The operator of the vehicle has three, well-known, primary devices to control the transmission 10. One of the primary control devices is a well known drive range selector (not shown) that directs the ECU 368 to configure the transmission for either the park, reverse, neutral, or forward drive range. The second and third primary control devices constitute an accelerator pedal (not shown) and a brake pedal (also not shown). The information obtained by the ECU 368 from these three primary control sources will hereinafter be referred to as the "operator demand." The ECU 368 also obtains information from both the first and second motor/generators 42 and 286, respectively, the engine 12 and the electric storage device 366. In response to an operator's action, the ECU 368 determines what is required and then manipulates the selectively operated components of the hybrid transmission 10 appropriately to respond to the operator demand.

For example, in the exemplary embodiment shown in FIGS. 1 and 2, when the operator has selected a forward drive range and manipulates either the accelerator pedal or the brake pedal, the ECU 368 determines if the vehicle should accelerate or decelerate. The ECU 368 also monitors the state of the power sources, and determines the output of the transmission required to effect the desired rate of acceleration or deceleration. Under the direction of the ECU 368 the transmission 10 is capable of providing a range of output speeds from slow to fast in order to meet the operator demand.

In order to provide a full explanation as to the operation of a transmission embodying the concepts of the present invention—which is a two-mode, compound-split, electro-mechanical, vehicular transmission—a description of the operational modes employed to achieve the output power and speeds necessary to meet the operator demand under various operating conditions are set forth in detail in the aforesaid U.S. Pat. No. 5,931,757.

Summation

A two-mode, compound-split, electro-mechanical transmission such as that identified by the numeral 10, which embodies the concepts of the present invention, employs three planetary gear subsets to provide the two-mode operation when operatively controlled by two torque transfer devices. Moreover, the three planetary gear subsets 60, 62 and 64 as well as both motor/generators 42 and 286 are coaxially disposed with the annular motor/generators 42 and 286 circumscribing the three planetary gear subsets 60, 62 and 64 in order to minimize the required envelope—i.e.: circumferential dimension—of the transmission 10.

To effect a significant reduction of the undesirable vibrations induced by the rotation of the planetary gear subsets 60 and 62, in particular, as well as the rotation of the rotors 174 and 300 of the first and second motor/generators 42 and 286, respectively, those masses are laterally grounded either directly to the transmission housing 34 or indirectly to the housing 34 though the transmission main shaft 56.

Conclusion

While only a preferred embodiment of the present invention is disclosed, it is to be understood that the concepts of the present invention are susceptible to numerous changes apparent to one skilled in the art. Therefore, the scope of the present invention is not to be limited to the details shown and described but is intended to include all variations and modifications which come within the scope of the appended claims.

As should now be apparent, the present invention teaches that a transmission embodying the concepts of the present invention is not only capable of achieving all the benefits of the transmission disclosed in the U.S. Pat. No. 5,931,757 but also accomplishes the other aspects of the invention—i.e.: the provision of a transmission that is free from undesirable vibrations. A two-mode, compound-split, electro-mechanical transmission that minimizes vibrations, said transmission comprising:

a housing;

said housing having a rigid frame capable of serving as a lateral ground to prevent lateral movement of selected rotatable members supported either directly or indirectly by said frame;

said frame having a generally hollow interior cavity with a generally cylindrical interior surface;

a forward grounding member rigidly secured to said frame and extending radially inwardly with respect thereto;

a rear grounding member rigidly secured to said frame and extending radially inwardly with respect thereto;

a rotatable input member for receiving power from a prime mover power source and delivering said power to said transmission mechanism;

a rotatable output member for delivering power from said transmission mechanism;

a main shaft extending axially within said frame for rotation with and with respect to both said input and said output members; bearing means not only to permit rotation of said input member with respect to said frame but also laterally to ground said input member with respect to said frame.

What is claimed is:

1. A two-mode, compound-split, electro-mechanical transmission that minimizes vibrations, said transmission comprising:

a housing;

said housing having a rigid frame capable of serving as a lateral ground to prevent lateral movement of selected rotatable members supported either directly or indirectly by said frame;

said frame having a generally hollow interior cavity with a generally cylindrical interior surface;

a forward grounding member rigidly secured to said frame and extending radially inwardly with respect thereto;

a rear grounding member rigidly secured to said frame and extending radially inwardly with respect thereto;

a rotatable input member for receiving power from a prime mover power source and delivering said power to said transmission mechanism;

a rotatable output member for delivering power from said transmission mechanism;

a main shaft extending axially within said fame for rotation with and with respect to both said input and said output members;

bearing means not only to permit rotation of said input member with respect to said frame but also laterally to ground said input member with respect to said frame;

additional bearing means not only to permit rotation of said main shaft with respect to said input member but also laterally to ground said main shaft through said input member to said housing frame; and further bearing means not only to permit rotation of said output member with respect to said frame but also laterally to ground said output member with respect to said frame.

2. An electro-mechanical transmission, as set forth in claim 1, further comprising:

still further bearing means not only to permit rotation of said main shaft with respect to said output member but also laterally to ground said main shaft through said output member to said housing fame.

3. An electro-mechanical transmission, as set forth in claim 2, further comprising:

at least two planetary gear subsets operatively positioned within said housing cavity;

each said planetary gear subset utilizing an inner, sun gear and an outer, ring gear;

a carrier incorporated in each planetary gear subset;

a plurality of planet gears rotatably mounted in each said carrier; and, each said carrier supported from said transmission main shaft so as to be laterally grounded.

4. An electro-mechanical transmission, as set forth in claim 3, further comprising:

first and second motor/generators coaxially aligned with each other and with each said planetary gear subset;

each said motor/generator having a stator and a rotor, said stators being secured to said generally cylindrical interior surface of said housing cavity with each rotor rotatably positioned inwardly with respect to the stator of that motor/generator with which said rotor is associated.

5. An electro-mechanical transmission, as set forth in claim 4, wherein:

said rotor in said first motor/generator is precluded from lateral movement by being grounded directly to said transmission housing.

6. An electro-mechanical transmission, as set forth in claim 5, wherein:

said rotor in said second motor/generator is precluded from lateral movement by being grounded directly to said transmission housing.

7. An electro-mechanical transmission, as set forth in claim 5, further comprising:

a first balance plate extending radially inwardly from the rotor of said first motor/generator to be interposed between said input member and said forward grounding member such that a still further bearing means may operatively coact with the bearing means interposed between said input member and said main shaft not only to permit relative rotation of said input member and said balance plate with respect to said forward grounding member but also laterally to ground said input member and said balance plate to minimize vibrations.

8. An electro-mechanical transmission, as set forth in claim 7, further comprising:

a grounding partition extending radially inwardly of said transmission housing frame to divide the hollow interior cavity of said transmission housing into forward and rearward compartments; and, a second balance plate extending radially inwardly from the rotor of said first motor/generator;

bearing means interposed between said second balance plate and said grounding partition to enhance the lateral grounding of the rotor in said second motor/generator.

9. An electro-mechanical transmission, as set forth in claim 8, further comprising:

a third planetary gear subset having and inner, sun gear and an outer, ring gear that meshingly engage a plurality of planet gears rotatably mounted on heir own carrier;

said three planetary gear subsets remaining coaxially aligned with each other and being disposed such that there will be an engine power split planetary gear subset located in the forward compartment of said housing cavity, an output planetary gear subset located in the rearward compartment of said housing cavity and a center planetary gear subset located in said forward compartment of said housing cavity between said engine power split planetary gear subset and said output planetary gear subset;

said first motor/generator being located in said forward compartment and said second motor/generator being located in said rearward compartment;

said first and second motor/generators continuing to remain coaxially aligned with each other and with said three planetary gear subsets;

a sleeve shaft circumscribing said transmission main shaft;

said sleeve shaft continuously connecting said inner sun gear of said output planetary gear subset to the inner sun gear of said central planetary gear subset as well as to the rotor of said second motor/generator; and, a yet further bearing means interposed between said sleeve shaft and said grounding partition to assure lateral grounding of said sleeve shaft.

10. An electro-mechanical transmission, as set forth in claim 9, wherein:

said carrier in said engine power split planetary gear subset as well as said carrier in said central planetary gear subset are precluded from lateral movement by being grounded directly to said transmission main shaft.

11. An electro-mechanical transmission, as set forth in claim 10, further comprising:

thrust bearings to effect longitudinal grounding of those rotatable members that have been laterally grounded.

12. A two-mode, compound-split, electro-mechanical transmission that minimizes vibrations, said transmission comprising:

a housing;

said housing having a rigid frame that presents a generally cylindrical interior surface defining a cavity that is bifuracted to provide forward and rearward compartments into which the mechanism of the transmission is received;

a rotatable transmission main shaft extending axially through both compartments of said housing cavity;

a rotatable input member for receiving power from a prime mover power source and delivering said power to said transmission mechanism;

a rotatable output member for delivering power from said transmission mechanism;

an engine power split planetary gear subset located in the forward compartment of said housing cavity;

an output planetary gear subset located in the rearward compartment of said housing cavity;

a center planetary gear subset located in said forward compartment of said housing cavity between said engine power split planetary gear subset and said output planetary gear subset;

first and second motor/generators being coaxially aligned with each other and with said three planetary gear subsets;

said first motor/generator located in said forward compartment and annularly circumscribing said engine power split planetary gear subset;

said second motor/generator located in said rearward compartment and annularly circumscribing said output planetary gear subset;

each said motor/generator having a stator and a rotor, said stators being secured to said generally cylindrical interior surface of said housing cavity with each rotor rotatably positioned inwardly with respect to the stator of that motor/generator with which said rotor is associated;

each planetary gear subset utilizing first and second rotatable gear members;

said first and second gear members of each planetary gear subset meshingly engaging a plurality of planet gears rotatably mounted on a carrier incorporated in each corresponding planetary gear subset;

said carriers being rotatably disposed coaxially of said transmission main shaft;

at least one of said gear members in said engine power split planetary gear subset and one of said gear members in said central planetary gear subset being operatively connected to the rotor in said first motor/generator;

at least one of said gear members in said central planetary gear subset and one of said gear members in said output planetary gear subset being operatively connected to the rotor in said second motor/generator;

means operatively to connect said carriers associated with each of said three planetary gear subsets to each other and to said to said output member;

that gear member in said central planetary gear subset not connected to said first motor/generator being continuously connected to one of said gear members in said output planetary gear subset;

that gear member of said engine power split planetary gear subset not connected to said first motor/generator being operatively connected to said input member;

that said gear member of said output planetary gear subset not connected to said central planetary gear subset being selectively precluded from rotation by being rotatably grounded to said transmission housing; and, means laterally to ground said transmission main shaft and at least selected of the rotatable members of the transmission to said housing to minimize the vibrations induced by said rotatable members so grounded.

13. An electro-mechanical transmission, as set forth in claim 12, wherein:

the carriers of said engine power split planetary gear subset and said central planetary gear subset each have a skeletal frame with a bracing plate defining one longitudinal end of said skeletal frame;

each said bracing plate has a central hub and a radially outer rim;

an annulus extends rearwardly from the outer rim of said bracing plate to terminate in a rearward extremity;

anchor block means located in proximity to the rearward extremity of said annulus;

a plurality of planet support shafts are secured to, and extend between, said bracing plate and said anchor block means;

a plurality of access apertures penetrate said annulus;

a planet gear is rotatably mounted on each said support shaft to be accessible through said access apertures;

each said hub circumscribes said transmission main shaft and is splined to said transmission main shaft to effect the lateral grounding of said carrier through said main shaft;

a hub plate is interposed between the carriers of said engine power split planetary gear subset and said central planetary gear subset;

the hub portion of said hub plate presents an inner, sun, gear meshingly to engage said planet gears in the carrier cage of said engine power split planetary gear subset; and, the plate portion of said hub plate presents the outer, ring, gear of said central planetary gear subset.

14. An electro-mechanical transmission, as set forth in claim 13, wherein:

that gear member in said central planetary gear subset and that gear member in said output planetary gear subset that are connected to said second motor/generator are so connected by a sleeve shaft;

said sleeve shaft is precluded from lateral movement by being grounded directly to said transmission housing; and, thrust bearings are employed to effect longitudinal grounding of those rotatable members that have been laterally grounded.

* * * * *